United States Patent
Volkow

(10) Patent No.: US 10,933,887 B2
(45) Date of Patent: Mar. 2, 2021

(54) METHOD AND SYSTEM FOR IMPLEMENTING A POLICY BASED CENTRAL ORCHESTRATION FOR AUTONOMOUS VEHICLES TO MEET LOCAL REGULATIONS AND REQUIREMENTS

(71) Applicant: OTONOMO TECHNOLOGIES LTD., Even Yehuda (IL)

(72) Inventor: Benjamin Volkow, Even Yehuda (IL)

(73) Assignee: OTONOMO TECHNOLOGIES LTD., Even Yehuda (IL)

( * ) Notice: Subject to any disclaimer, the term of this patent is extended or adjusted under 35 U.S.C. 154(b) by 0 days.

(21) Appl. No.: 16/330,107

(22) PCT Filed: Sep. 4, 2017

(86) PCT No.: PCT/IL2017/050987
§ 371 (c)(1),
(2) Date: Mar. 4, 2019

(87) PCT Pub. No.: WO2018/042444
PCT Pub. Date: Mar. 8, 2018

(65) Prior Publication Data
US 2019/0232973 A1    Aug. 1, 2019

Related U.S. Application Data

(60) Provisional application No. 62/383,444, filed on Sep. 4, 2016.

(51) Int. Cl.
*B60W 50/08*    (2020.01)
*B60W 50/12*    (2012.01)
(Continued)

(52) U.S. Cl.
CPC .......... *B60W 50/082* (2013.01); *B60W 50/08* (2013.01); *B60W 50/12* (2013.01);
(Continued)

(58) Field of Classification Search
CPC .... G05D 1/0011; G05D 1/0088; G07C 5/008; G07C 9/00309; G07C 2009/0793; B60W 30/02; G08G 1/20; B60R 25/24
See application file for complete search history.

(56) References Cited

U.S. PATENT DOCUMENTS 5,234,305 A * 8/1993 Hotta ................ E04H 6/10
414/228
5,367,456 A * 11/1994 Summerville ....... G05D 1/0297
701/24
(Continued)

OTHER PUBLICATIONS

International Search Report of PCT Application No. PCT/IL2017/050987, dated Feb. 1, 2018.

*Primary Examiner* — Mussa A Shaawat
(74) *Attorney, Agent, or Firm* — Pearl Cohen Zedek Latzer Baratz LLP

(57) ABSTRACT

A system, a method, and a computer readable medium for communicating vehicle-specific policy to autonomous vehicles are provided herein. The method may include the following steps: storing, sensing and transmitting to the cellular communication network, data associated with autonomous vehicles; maintaining a set of rules for operational parameters of the autonomous vehicles, applying the data associated with the autonomous vehicles for each respective autonomous vehicle to the policy database, to yield a vehicle-specific configuration command; and generating a vehicle-specific configuration command to be sent to the respective autonomous vehicle, that when reaches the autonomous vehicle, configures the autonomous vehicles into one of a plurality of operational configurations.

14 Claims, 2 Drawing Sheets

(51) Int. Cl.
  *G05D 1/00*     (2006.01)
  *G07C 5/00*     (2006.01)
  *G08G 1/00*     (2006.01)
  *G08G 1/0967*   (2006.01)
  *H04W 4/40*     (2018.01)

(52) U.S. Cl.
  CPC ......... *G05D 1/0022* (2013.01); *G05D 1/0061* (2013.01); *G07C 5/008* (2013.01); *G08G 1/096725* (2013.01); *G08G 1/096741* (2013.01); *G08G 1/096775* (2013.01); *G08G 1/20* (2013.01); *G08G 1/207* (2013.01); *H04W 4/40* (2018.02); *G05D 2201/0213* (2013.01)

(56) References Cited

U.S. PATENT DOCUMENTS

| | | | | |
|---|---|---|---|---|
| 5,980,185 | A * | 11/1999 | Vita | E04H 6/422 |
| | | | | 414/254 |
| 6,641,351 | B2 * | 11/2003 | Payne | E04H 6/14 |
| | | | | 414/234 |
| 8,056,667 | B2 * | 11/2011 | Moshchuk | B62D 15/0285 |
| | | | | 180/169 |
| 8,095,273 | B2 * | 1/2012 | Moshchuk | B62D 15/0285 |
| | | | | 180/197 |
| 8,098,174 | B2 * | 1/2012 | Moshchuk | B62D 15/0285 |
| | | | | 340/425.5 |
| 8,099,214 | B2 * | 1/2012 | Moshchuk | B62D 15/0285 |
| | | | | 180/204 |
| 8,589,014 | B2 * | 11/2013 | Fairfield | G05D 1/024 |
| | | | | 701/28 |
| 8,880,270 | B1 * | 11/2014 | Ferguson | B60W 30/00 |
| | | | | 701/23 |
| 10,384,678 | B1 * | 8/2019 | Konrardy | B60R 21/0136 |
| 10,386,192 | B1 * | 8/2019 | Konrardy | G01C 21/3461 |
| 10,386,845 | B1 * | 8/2019 | Konrardy | B60R 16/0234 |
| 10,395,332 | B1 * | 8/2019 | Konrardy | G05D 1/0246 |
| 2008/0122604 | A1 * | 5/2008 | Hattori | G01S 15/931 |
| | | | | 340/441 |
| 2011/0182703 | A1 * | 7/2011 | Alan | E04H 6/183 |
| | | | | 414/231 |
| 2013/0041547 | A1 | 2/2013 | Goodermuth et al. | |
| 2014/0097971 | A1 * | 4/2014 | Barth | G01S 15/87 |
| | | | | 340/932.2 |
| 2014/0180523 | A1 * | 6/2014 | Reichel | B62D 15/0285 |
| | | | | 701/23 |
| 2014/0371972 | A1 * | 12/2014 | Jecker | B62D 15/027 |
| | | | | 701/23 |
| 2015/0039173 | A1 * | 2/2015 | Beaurepaire | B62D 15/0285 |
| | | | | 701/23 |
| 2015/0039213 | A1 * | 2/2015 | Stefan | B62D 15/0285 |
| | | | | 701/117 |
| 2015/0070196 | A1 * | 3/2015 | Beaurepaire | B62D 15/028 |
| | | | | 340/932.2 |
| 2015/0088360 | A1 * | 3/2015 | Bonnet | B60W 30/06 |
| | | | | 701/23 |
| 2015/0149019 | A1 * | 5/2015 | Pilutti | G08G 1/096791 |
| | | | | 701/23 |
| 2015/0241878 | A1 * | 8/2015 | Crombez | B60W 30/12 |
| | | | | 701/23 |
| 2015/0370255 | A1 * | 12/2015 | Harvey | G05D 1/0027 |
| | | | | 701/24 |
| 2016/0171894 | A1 * | 6/2016 | Harvey | G05D 1/0293 |
| | | | | 701/23 |
| 2016/0224028 | A1 | 8/2016 | Harvey | |
| 2016/0232788 | A1 | 8/2016 | Byun | |
| 2018/0074513 | A9 * | 3/2018 | Harvey | G05D 1/0295 |

* cited by examiner

METHOD AND SYSTEM FOR IMPLEMENTING A POLICY BASED CENTRAL ORCHESTRATION FOR AUTONOMOUS VEHICLES TO MEET LOCAL REGULATIONS AND REQUIREMENTS

CROSS-REFERENCE TO RELATED APPLICATIONS

This application is a National Phase Application of PCT International Application No. PCT/IL2017/050987, International Filing Date Sep. 4, 2017, entitled "METHOD AND SYSTEM FOR IMPLEMENTING A POLICY BASED CENTRAL ORCHESTRATION FOR AUTONOMOUS VEHICLES TO MEET LOCAL REGULATIONS AND REQUIREMENTS", published on Mar. 8, 2018, under publication No. WO 2018/042444, which claims the benefit of U.S. Provisional Patent Application No. 62/383,444, filed on Sep. 4, 2016, all of which are hereby incorporated by reference in their entireties.

FIELD OF THE INVENTION

The present invention relates generally to the field of policy engines, and more particularly to policy engines applicable to configuring autonomous vehicles per local regulations and requirements.

BACKGROUND OF THE INVENTION

Prior to setting forth the background of the invention, it may be helpful to set forth definitions of certain terms that will be used hereinafter.

The term "policy engine" as used herein is defined as a software component allowing to create, monitor and enforce rules about how networked resources should be used.

The term "autonomous vehicle" as used herein is defined as a vehicle capable of navigating without human input. Autonomous cars can detect surroundings using a variety of techniques. Autonomous cars have control systems that are capable of analyzing sensory data to distinguish between different cars on the road, which is very useful in planning a path to the desired destination. The degree of autonomy is considered a main characteristic of autonomous cars. By way of example, in the United States, the National Highway Traffic Safety Administration (NHTSA) has proposed a formal classification system:

Level 0: The driver completely controls the vehicle at all times.
Level 1: Individual vehicle controls are automated, such as electronic stability control or automatic braking.
Level 2: At least two controls can be automated in unison, such as adaptive cruise control in combination with lane keeping.
Level 3: The driver can fully cede control of all safety-critical functions in certain conditions. The car senses when conditions require the driver to retake control and provides a "sufficiently comfortable transition time" for the driver to do so.
Level 4: The vehicle performs all safety-critical functions for the entire trip, with the driver not expected to control the vehicle at any time. As this vehicle would control all functions from start to stop, including all parking functions, it could include unoccupied cars.

From a regulatory standpoint, every country and state views autonomous vehicles and the blessings and risks they bring differently, and every country and state handles regulation and requirements differently.

Those differences between countries, states, and geographic areas create a new challenge for the autonomous vehicles and their adoption. Those vehicles will need to adapt when moving from state to state or from country to country to different requirements and different local regulations.

In order to conform to those challenges and requirements, there is a need for central orchestration of autonomous cars configuration.

SUMMARY OF THE INVENTION

Some embodiments of the present invention provide a system and a method for enabling a central orchestration of autonomous cars. where based on configured policies and rules and with different input sources, (like car data, weather, traffic and travel conditions, security alerts and other relevant traveling and driving input sources). The central orchestration will run the different input sources data via its policy and rules engine and will define what the applicable set of rules to the vehicle is and will send it downlink towards the car.

Some embodiments of the present invention provide a system for communicating vehicle-specific policy to autonomous vehicles. The system may include a computer processor in communication with a cellular communication network; a plurality of communication devices located on the autonomous vehicles configured to store, sense and transmit to the cellular communication network, data associated with the autonomous vehicles; and a policy database configured to store a set of rules for operational parameters of the autonomous vehicles, wherein the computer processor is configured to: apply the data associated with the autonomous vehicles for each respective autonomous vehicle to the policy database, to yield a vehicle-specific configuration command; and generate a vehicle-specific configuration command to be sent to the respective autonomous vehicle, that when reaches the autonomous vehicle, configures the autonomous vehicles into one of a plurality of operational configurations.

According to some embodiments of the present invention, the system may further include a broker module connected to the computer processor and configured to receive the configuration command from the computer processor and instruct the communication network to send it to the respective autonomous vehicle.

According to some embodiments of the present invention, the communication devices on the autonomous vehicles have enforcement entities storing vehicle-specific rules that are overridden by the configuration command in case of a conflict.

According to some embodiments of the present invention, the configuration command affects autonomous level of the autonomous vehicle.

According to some embodiments of the present invention, the configuration command limits operation of the autonomous vehicle.

According to some embodiments of the present invention, the data associated with the autonomous vehicles may be time variant and includes at least one of: speed, location, weather, recent history.

According to some embodiments of the present invention, the data associated with the autonomous vehicles may be time invariant and includes at least one of: type of car, profile of a driver.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
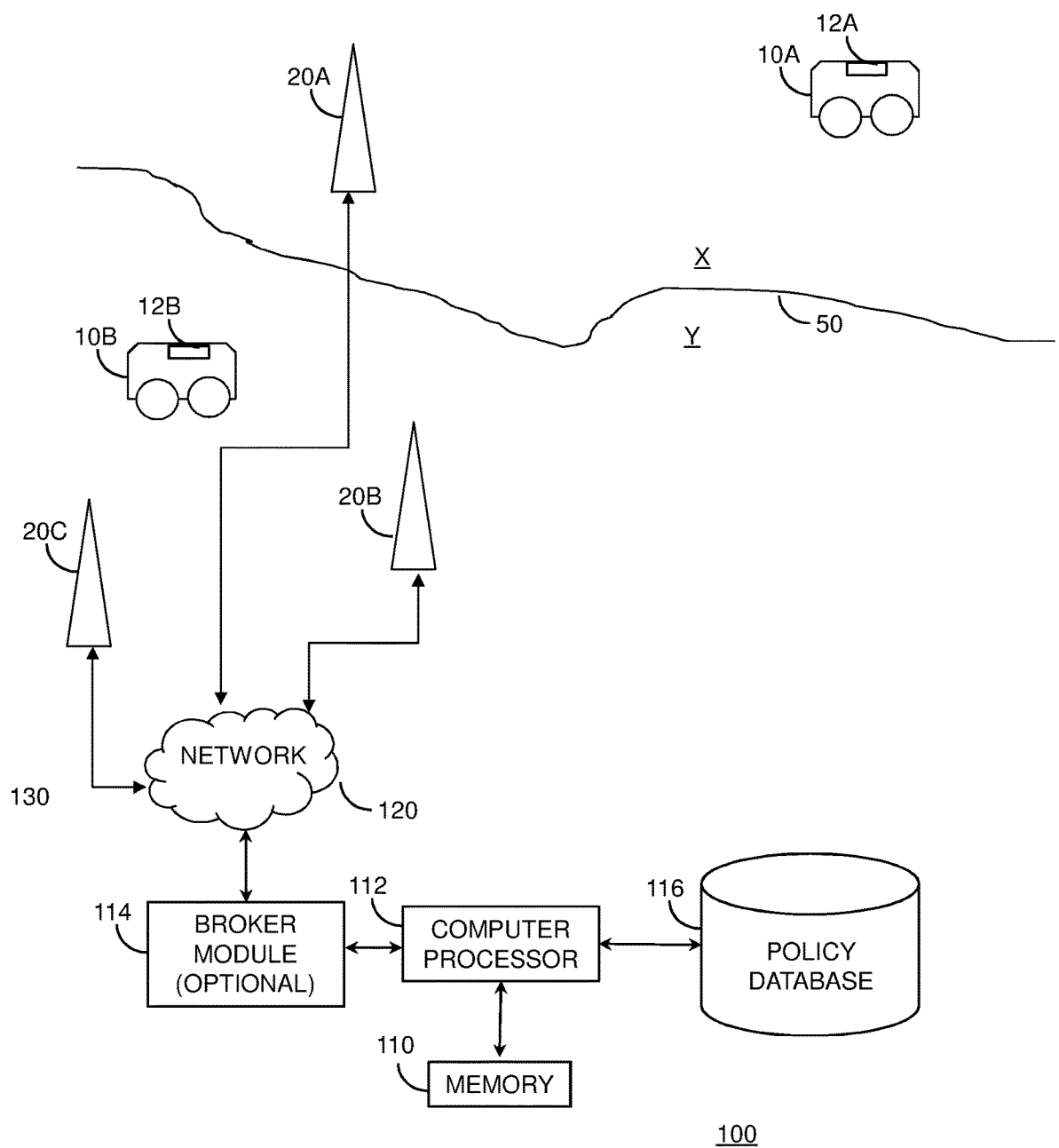
FIG. 1 is a block diagram illustrating non-limiting exemplary architecture of a file system in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating", "recalculating", "determining," or the like, refer to the action and/or processes of a computer or computing system, or similar electronic computing device or software, that manipulates and/or transforms data represented as physical or logical, such as electronic, quantities within the computing system's registers and/or memories into other data similarly represented as physical or logical quantities within the computing system's memories, registers or other such information storage, transmission or display devices.

FIG. 1 is a block diagram illustrating non-limiting exemplary architecture of a computer-based system 100 in accordance with embodiments of the present invention. A system 100 for communicating vehicle-specific policy to autonomous vehicles 10A, 10B, may be deployed over an area that may include more than one legal jurisdiction X, Y (such as different state, or municipality) each having a set of rules, or policy relating to autonomous vehicles in various parameters. System 100 may preferably be orchestrated by a centralized computer processor 112 and memory 110 configured as a server in communication with a cellular communication network 120 managing base stations 20A-20C within the controlled area.

Each of autonomous vehicles 10A, 10B may be equipped with a respective communication device 12A, 12B that may be configured to store, sense and transmit to cellular communication network 120, data associated with the autonomous vehicles. The data may include any time-variant information such as speed, direction of driving, location and recent history, as well as time-invariant data associated with the vehicle (car type) and the driver (profile).

System 100 may include a policy database 116 in communication with server (computer processor 112 and memory 110). Policy database 116 may be configured to store a set of rules for operational parameters of the autonomous vehicles.

In operation, computer processor 112 may be configured to apply the data associated with the autonomous vehicles for each respective autonomous vehicle to the policy database to yield a vehicle-specific configuration command. Then, computer processor 112 may be configured to instruct cellular communication network 120 to send the vehicle-specific configuration command to the respective autonomous vehicle (e.g, 10A), that when reaches the autonomous vehicle, configures the autonomous vehicles into one of a plurality of predefined operational configurations.

According to some embodiments of the present invention, the rules implemented by system 100 may have different weights and impacts, depending on their effects, safety hazard associate and the issuing party (government, municipality, insurance company, car OEM, fleet manager and the like.) System 100 may have the discretion and the ability to give more weight to some of the rules compared to other on an ad hoc basis, and additionally, some rules may be optional while others are mandatory.

According to some embodiments of the present invention, the downlink delivery of the instruction via the cellular network may be carried out directly from computer processor 112 or via a broker module 114 being a server that may be controlled by a third party such as a municipality, government agency, car OEM, fleet manager, communication service provider and the like. Broker module 114 may transmit down to the car the information supplied by the central orchestration implemented by compute processor 112 and policy database 116 so separation between policy implementation and sending the instruction command is maintained (e.g. for regulatory reasons).

According to some embodiments of the present invention inside the car there is an enforcement entity as part of the communication device 12A, 12B that know to keep limited set of rules to enable the car to operate even in areas with no network connectivity. However, since regulations and requirements are changing often and there for policies and rules are affected, the central orchestration which is available to the vehicle via the network will have the latest set of parameters and will have the higher "authority" and in a case of conflict, the rules coming from system 100 override the rules on the enforcement entity. It's important to highlight again that the enforcement of the policies will be done in the vehicle itself and the vehicle will be able to operate and travel even without network connection.

For illustrative purposes, the following are some non-limiting use cases that may be addressed by embodiments of the present invention.

Use Case 1

In state X it is allowed to drive only autonomous level #3 and above. In state Y it is allowed to drive only autonomous #4 (which is more autonomous than level #3) and above.

A car which supports only autonomous level #3 is crossing the border (indicated 50) between state X to Y. There is a need to tell the car to move from autonomous level #3 driving to manual (since level #3 autonomous is not allowed in state Y).

The Central orchestration will check the different parameters coming from the car, and based on configured set of policies and rules will send down a notification to move to manual mode.

Use Case 2

In area X it is allowed to drive autonomous level #4 when it's not raining or snowing only. In area Y weather is not a parameter taken into account in making decisions between different autonomous levels and manual driving. It is snowing and a car is crossing between area Y to area X. The Central orchestration will receive car data and by running it in the policy and rules engine and taking into account weather conditions will send notification to move to manual driving mode to comply with area X regulations.

Use Case 3

In country X it is allowed to drive autonomous levels #3-#5 in all highways. In country Y it is allowed to drive autonomous levels #3-#5 only where there are dedicated autonomous highway lanes. A car is crossing the border between country X to country Y and enters a highway with no dedicated autonomous driving highway lane. The Central orchestration will receive car data and location and will run it via the policy and rules engine and taking into account the different parameter will send a notification downlink to move to manual driving mode.

Use Case 4

In state X it is allowed for autonomous cars to drive autonomous only up to 100 mile per hour (MPH). In state Y it is allowed to drive up to 120 MPH in autonomous mode. A car crosses from state Y to state X. The Central orchestration will receive car data and based on the inputs he has from the car and other input sources and the configured rules and policies will send a notification downlink to reduce autonomous driving speed below 100 MPH.

Use Case 5

In area X it is allowed to drive autonomous only in non-peak hours (10 am-3 pm). In area Y it is allowed to drive autonomous all times of day. An autonomous car crosses from area X to area Y. The Central orchestration will receive car data and location and will run it via the policy and rules engine and taking into account the different parameters from the car and other input sources will send a notification downlink towards the car to move to manual driving mode.

Figure 2:
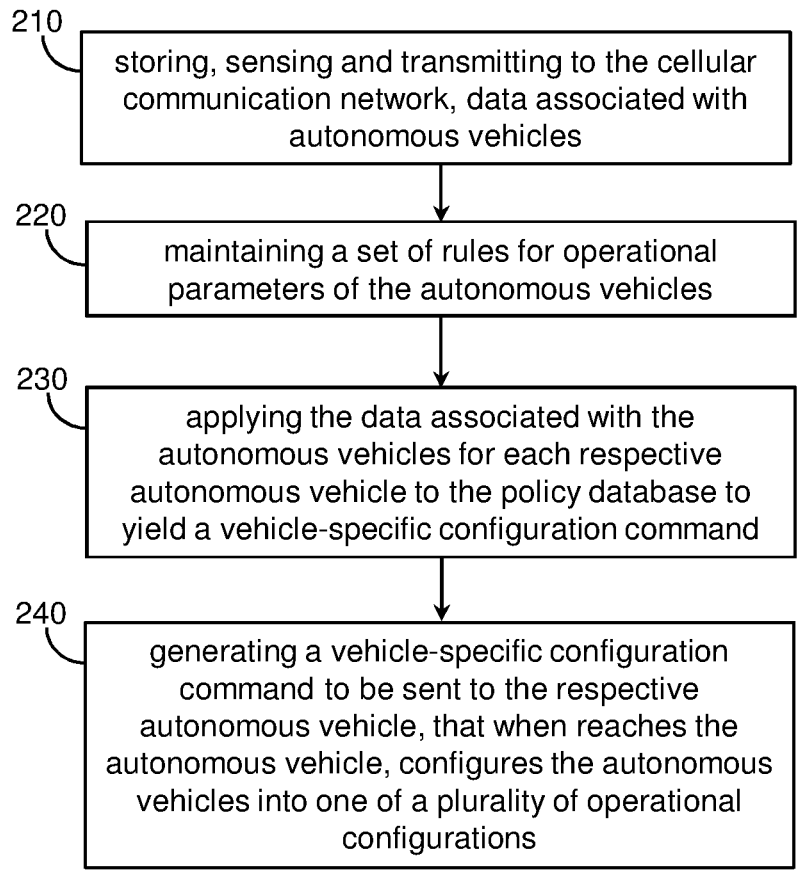
FIG. 2 is a high level flowchart illustrating non-limiting exemplary method in accordance with embodiments of the present invention.

FIG. 2 is a high level flowchart illustrating non-limiting exemplary method for communicating vehicle-specific policy to autonomous vehicles. Method 200 may include: storing, sensing and transmitting to the cellular communication network, data associated with autonomous vehicles 210; maintaining a set of rules for operational parameters of the autonomous vehicles 220; applying the data associated with the autonomous vehicles for each respective autonomous vehicle to the policy database to yield a vehicle-specific configuration command 230; and generating a vehicle-specific configuration command to be sent to the respective autonomous vehicle, that when reaches the autonomous vehicle, configures the autonomous vehicles into one of a plurality of operational configurations 240.

According to some embodiments, method 200 may include the step of receiving the configuration command from the computer processor and instructing the communication network to send it to the respective autonomous vehicle.

In accordance with embodiments of the present invention, there is provided a non-transitory computer readable medium comprising a set of instructions that when executed cause at least one processor to: store, sensing and transmitting to the cellular communication network, data associated with autonomous vehicles; maintain a set of rules for operational parameters of the autonomous vehicles, apply the data associated with the autonomous vehicles for each respective autonomous vehicle to the policy database to yield a vehicle-specific configuration command; and generate a vehicle-specific configuration command to be sent to the respective autonomous vehicle, that when reaches the autonomous vehicle, configures the autonomous vehicles into one of a plurality of operational configurations.

In order to implement the method according to embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, Python or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for communicating vehicle-specific policy to autonomous vehicles, the system comprising:
    a computer processor in communication with a cellular communication network;
    a plurality of communication devices located on the autonomous vehicles and configured to: store, sense and transmit to the cellular communication network, data associated with the autonomous vehicles, wherein the autonomous vehicles are configurable in two or more levels of autonomous operation; and
    a policy database configured to store a set of rules for operational parameters of the autonomous vehicles,
    wherein the computer processor is configured to:
    apply the data associated with the autonomous vehicles for each respective autonomous vehicle to the policy database to yield a vehicle-specific configuration command; and
    generate a vehicle-specific configuration command to be sent to the respective autonomous vehicle, that when reaches the autonomous vehicle, configures the autonomous vehicles into one of a plurality of operational configurations,
    wherein the communication devices on the autonomous vehicles have policy enforcement entities which store vehicle-specific rules that are overridden by the configuration command in a case of a conflict between the vehicle-specific rules and the configuration command,
    wherein the configuration command affects said levels of autonomous operation of the autonomous vehicles and
    wherein the computer processor is further configured to re-apply the data associated with the autonomous vehicles for the respective autonomous vehicle to the policy database to yield a vehicle-specific configuration command, upon a change in a location of the respective autonomous vehicle between any one of: a geographic area, a state, and a country.

2. The system according to claim 1, further comprising a broker module connected to the computer processor and configured to receive the configuration command from the compute processor and instruct the communication network to send it to the respective autonomous vehicle.

3. The system according to claim 1, wherein the configuration command limits operation of the autonomous vehicle.

4. The system according to claim 1, wherein the data associated with the autonomous vehicles is time variant and includes at least one of: speed, location, weather, recent history.

5. The system according to claim 1, wherein the data associated with the autonomous vehicles is time invariant and includes at least one of: type of car, profile of driver.

6. A method for communicating vehicle-specific policy to autonomous vehicles, the method comprising:
    storing, sensing and transmitting to the cellular communication network, data associated with autonomous vehicles, wherein the autonomous vehicles are configurable in two or more levels of autonomous operation;
    maintaining a set of rules for operational parameters of the autonomous vehicles,
    applying the data associated with the autonomous vehicles for each respective autonomous vehicle to the policy database to yield a vehicle-specific configuration command;
    re-applying the data associated with the autonomous vehicles for the respective autonomous vehicle to the policy database to yield a vehicle-specific configuration command, upon a change in a location of the respective autonomous vehicle between any one of: a geographic area, a state, and a country; and
    generating a vehicle-specific configuration command to be sent to the respective autonomous vehicle, that when reaches the autonomous vehicle, configures the autonomous vehicles into one of a plurality of operational configurations,
    wherein the communication devices on the autonomous vehicles have policy enforcement entities which store vehicle-specific rules that are overridden by the configuration command in a case of a conflict between the vehicle-specific rules and the configuration command, and
    wherein the configuration command affects said levels of autonomous operation of the autonomous vehicles.

7. The method according to claim 6, further comprising receiving the configuration command from the computer processor and instructing the communication network to send it to the respective autonomous vehicle.

8. The method according to claim 6, wherein the configuration command limits operation of the autonomous vehicle.

9. The method according to claim 6, wherein the data associated with the autonomous vehicles is time variant and includes at least one of: speed, location, weather, recent history.

10. The method according to claim 6, wherein the data associated with the autonomous vehicles is time invariant and includes at least one of: type of car, profile of driver.

11. A non-transitory computer readable medium comprising a set of instructions that when executed cause at least one processor to:
- store, sensing and transmitting to the cellular communication network, data associated with autonomous vehicles, wherein the autonomous vehicles are configurable in two or more levels of autonomous operation;
- maintain a set of rules for operational parameters of the autonomous vehicles,
- apply the data associated with the autonomous vehicles for each respective autonomous vehicle to the policy database to yield a vehicle-specific configuration command;
- re-apply the data associated with the autonomous vehicles for the respective autonomous vehicle to the policy database to yield a vehicle-specific configuration command, upon a change in a location of the respective autonomous vehicle between any one of: a geographic area, a state, and a country; and
- generate a vehicle-specific configuration command to be sent to the respective autonomous vehicle, that when reaches the autonomous vehicle, configures the autonomous vehicles into one of a plurality of operational configurations, wherein the communication devices on the autonomous vehicles have policy enforcement entities which store vehicle-specific rules that are overridden by the configuration command in a case of a conflict between the vehicle-specific rules and the configuration command, and wherein the configuration command affects said levels of autonomous operation of the autonomous vehicles.

12. The non-transitory computer readable medium according to claim 11, further comprising a set of instructions that when executed cause the at least one processor to receive the configuration command from the computer processor and instructing the communication network to send it to the respective autonomous vehicle.

13. The non-transitory computer readable medium according to claim 11, wherein the configuration command limits operation of the autonomous vehicle.

14. The non-transitory computer readable medium according to claim 11, wherein the data associated with the autonomous vehicles is time variant and includes at least one of: speed, location, weather, recent history.

* * * * *